Sept. 15, 1970 J. A. W. BUTCHER 3,529,091

TELEPHONE EXCHANGES WITH DUAL USE OF LINK CIRCUIT

Filed Oct. 26, 1966 2 Sheets-Sheet 2

United States Patent Office 3,529,091
Patented Sept. 15, 1970

3,529,091

TELEPHONE EXCHANGES WITH DUAL USE OF LINK CIRCUIT

John Anthony Weeks Butcher, Stanstead, Essex, England, assignor to International Standard Electric Corporation, New York, N.Y., a corporation of Delaware Filed Oct. 26, 1966, Ser. No. 589,566
Claims priority, application Great Britain, Nov. 10, 1965, 47,657/65
Int. Cl. H04q 3/42
U.S. Cl. 179—18 10 Claims

ABSTRACT OF THE DISCLOSURE

A telephone exchange comprising a switching network having inlets and outlets. Means are provided for using the originally seized link circuit that is used in coupling the calling line to the register for further use in connecting the calling line to the called line.

The present invention relates to automatic telecommunication exchanges.

An object of this invention is to provide telephone exchanges wherein the link that is used in the connection of the calling line through to a register is also used to connect the calling line to the called line through the switching network of the exchange.

According to the present invention there is provided an automatic telecommunication exchange in which a connection from a calling line to a register to be used in controlling the establishment of a connection is effected by connecting the calling line via a switching network to an idle link circuit from which a connection is established to a free register, also via the said switching network. The connection from the calling line to the called line is established by connecting the originally-seized links or cord circuit via said switching network to the called line thereafter the register and the connection therefrom to said link circuit via said switching network are released.

Figure 1:
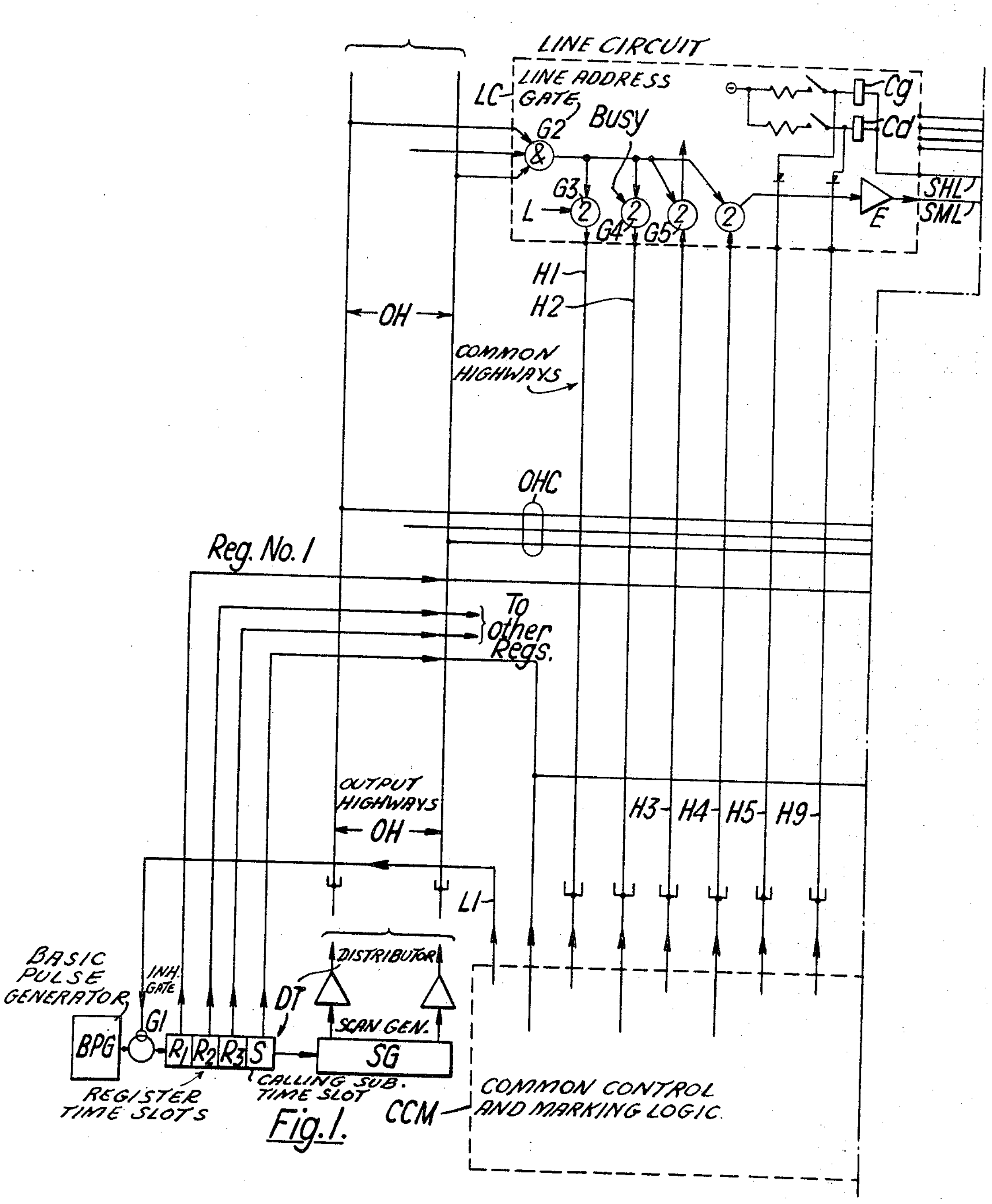

An embodiment of the invention will now be described with reference to the accompanying drawings, in which FIGS. 1 and 2, of which FIG. 2 should be placed to the right of FIG. 1, show in simplified schematic form an embodiment of the present invention.

Brief Introduction.—In conventional "space division" switching systems using rectangular matrices and register/marker control techniques the subscriber's lines are scanned to detect calling lines. When a calling line is detected, the "address" of this line can be determined from the position of the scanner and an indication is obtained from a register allotter and a link allotter of the identities of the next free register and link circuit that are available for the connection between a register and that calling subscriber. This information is applied to a cormon marker, usually under control of the allotted register, so that the path between the calling subscriber and the allotted register can be set up through the switching network. In the case of the simple rectangular matrix as shown herein, elaborate route selection techniques are not required, although in the case of multi-stage matrices such route selection techniques would be needed.

When a connection between the calling subscriber and a register has been set up, the calling subscriber signals to the register the wanted number. This, or its equivalent equipment number, is stored in the register with the calling subscriber's number or equivalent equipment number. The register then transfers this information relating to the calling and called subscriber identities to the marker and by reference to the link allotter the marker identifies a link that can be used for connecting the calling and called subscribers. Essentially the operation of the marker is to select the next free link, and mark this in turn to the calling and called subscribers. The release of the register from the calling subscriber and the ensuing release of the original link used in the calling subscriber to register connection may be either under the control of the register, or may occur automatically as a result of marking to the calling subscriber from the newly selected link.

Thus in such a known system, it will be seen that the register has to store the calling subscriber's identity as well as that of the called subscriber. However, the register may also contain a quantity of processing logic circuitry associated with the transfer of information to the marker. Depending upon the detailed approach to the control, the marker may be provided with information storage facilities on which the calling and called subscriber identities are stored while the marking operation is taking place. It is clear that certain specific solutions may collect the register storage to some form of common store which may prove more economic than individual storage within the registers, but irrespective of this common storage possibility, the above approach requires that the storage of the calling subscriber identity is required within the control area of the switching system for setting up the final connection.

The main point at which the arrangement to be described herein differs from the systems such as described above is that the link circuit originally seized and used for the calling line-to-register connection is used for the connection finally completed between the calling line and the called line. At this point it is worth mentioning that the term "link circuit" is most often applied to the circuit sometimes referred to herein as a "cord" circuit.

In the system described herein, a connection between an inlet to the switching network and an outlet therefrom is established as a result of markings applied to the inlet and that outlet. Thus to connect the calling line and the register, that line, the register and a free cord circuit are all marked. This causes a connection to be set up through the switching network from the calling line to the link circuit, and another connection to be set up from that cord circuit to the register. Then dial tone is transmitted to the caller, who dials into the register. When the wanted number has been fully received, the corresponding line is marked under the control of the register and in addition the link circuit to which the register is connected is marked with a further marking condition—referred to also as a re-mark. The combination of the called line marking and the link circuit re-mark causes a connection to be established between that cord circuit and the called line, after which the register and the connection therefrom to the cord circuit are released. One of the advantages of this method of operation is that, since the originally set up connection from the calling line to the cord circuit is not released, the register does not have to store the caller's identity. This reduces the storage capacity needed, and since no second connection needs to be set up to the calling line the amount of processing needed in the circuitry common to the registers and the cord circuits is reduced.

The arrangement to be described herein uses as its switching network a simple co-ordinate reed relay matrix, and so does not need to have route selection arrangements. However, the technique used whereby the same link serves for the calling line-called line connection as was used for the calling line-register connection is equally applicable to multi-stage switching arrangements. In such cases, some form of route selection arrangement is needed, however.

Figure 2:
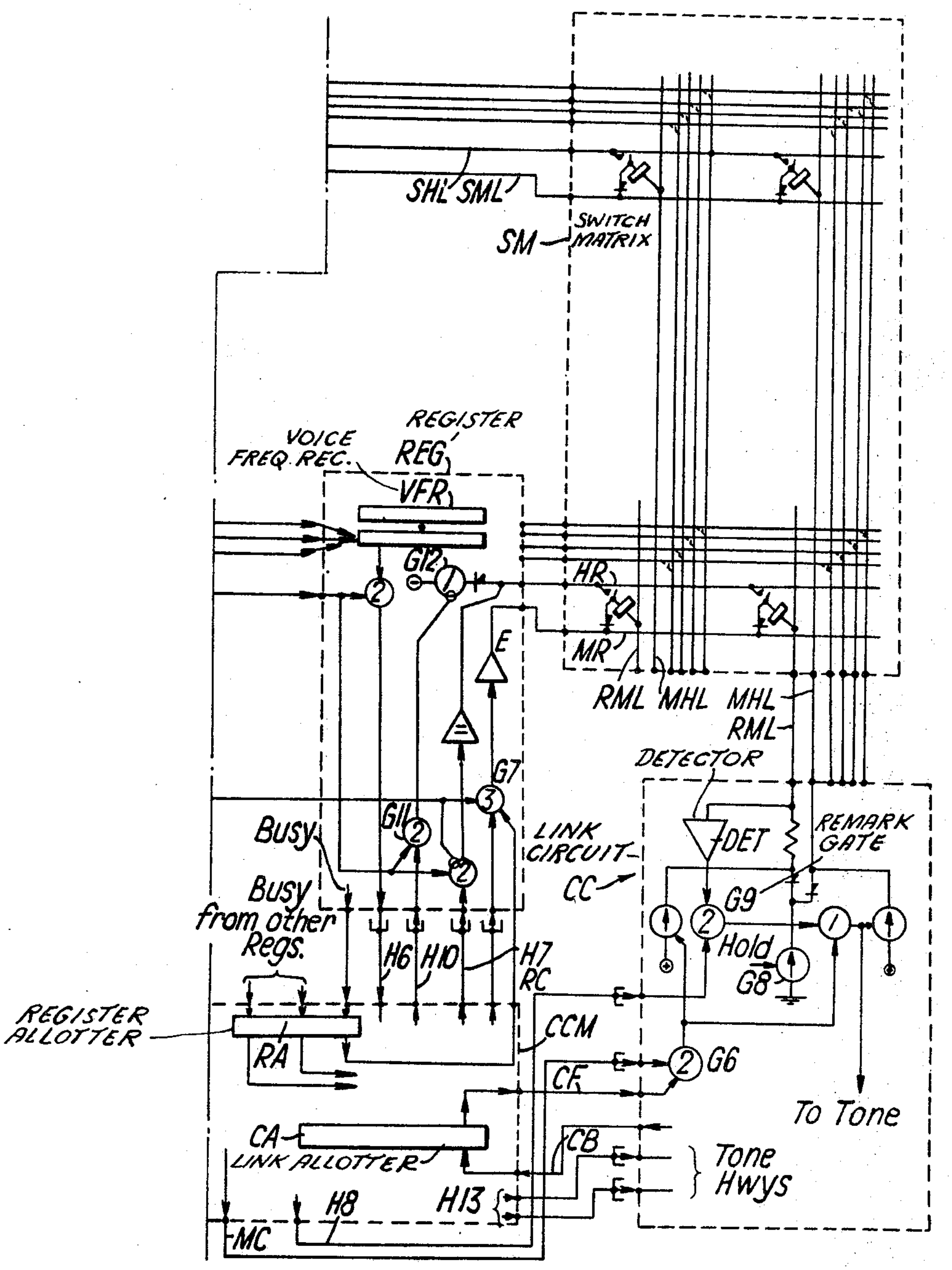

Description of FIGS. 1 and 2.—The simplified block diagram of the exchange, FIGS. 1 and 2 includes line circuit LC, switch matrix SM, registers such as REG, cord circuits such as CC, common control and marking logic CCM and the scan generator SG. Sufficient of the control logic within the sections of the switching systems is shown to enable the features of the call setup method to be described. The exchange described herein uses 4-wire switching, but this does not preclude the application of the basic ideas to exchanges using two-wire switching. Likewise the description is in terms of a single stage switching network, but this again does not preclude the extension of this method to exchanges using other forms of switching array.

Consider first the scan generator. This includes a basic pulse generator BPG whose output can be inhibited from the common control CCM via a gate G1, and which drives a distributor DT so that a time-slot is allocated to each register (R1, R2, R3) and a final time-slot S is allotted for the examination for calling subscribers. An output occurring at each complete cycle of this distributor drives the scan generator SG. This circuit SG consists of counters which generate in coded form the identities of the subscriber line circuits, which identities correspond to their directory numbers. In the present case it is assumed that a three-digit numbering scheme is used, and that SG generates three-digit address code combinations, one per subscriber line, in the form of three groups of two-out-of-five coding. The outputs of this generator SG are applied to a set of common output highways OH which are connected to the line circuits. Thus for each combination representing a subscriber identity, there are four time positions allocated respectively to registers 1, 2, 3 (assuming that three registers are sufficient to handle the traffic through the exchange), and to a calling subscriber period in which the approriate line is tested for the presence of a calling condition. The inhibit gate G1 enables the scan to be halted on any of the four-subdivisions within any output combination of SG.

In each line circuit there is a line address gate G2, whose function is to "pick off" the particular code corresponding to that line circuit from the common highways OH and to scan the information relating to that line circuit. The results of this scan are transmitted to the common control over common highways in the case of a calling line, and also a busy line. For a calling line the scan result is sent via gate G3 and a common highway H1. The gate G3 is normally closed, but opens when the line is in the calling condition. In the case of a busy line gate G4 is opened by the busy condition and the transmission is over highway H2, which is also common to all line circuits. Similar common highways to be referred to later and running from the common control to all line circuits enable line circuits to be marked and up-dated to busy when the output of the line address gate G2 is active. Additional common highways from the control to all line circuits also enable the marking of line circuits as either calling or called. This latter is needed by the form of a single stage switch matrix, and by the requirement for four-wire switching. In the present case, ringing is provided from line circuit. The switch matrix, FIG. 2, consists of a rectangular array which is divided into two portions. The first portion has subscriber terminations and for each such termination there are outputs for the four-wire line circuit and in addition a subscriber hold lead SHL and a subscriber mark lead SML. Each cross-point has a reed relay whose contacts set up the row-column connection, and this relay's winding is connected via one of its own make contacts between the hold lead SHL and a mark and hold lead MHL going into the cord or links circuits CC, one of these link circuits being connected to each column of the matrix. The register group terminations are similar to those for subscribers, and the wiring of the cross-point is also similar, but on the link circuit side of the cross-point, connection is made to a separate register mark and hold lead RML going into the link circuit. A register REG includes a voice-frequency receiver VFR for interpreting multi-VF signalling from a subscriber, and the output of VFR is staticised in a comparator, the information therein being the called subscriber identities. The comparator is also connected to the common output highways OH of the generator SG via connections OHC so that when the staticised information in the register corresponds to that on the highways OH a positive indication of comparison can be given within the register. The registers are scanned during each subscriber identity combination, and during its register time period a register may have access to the common control CCM over common highways. Similarly the common control may send marking and release instructions to the register. The marking of a register to enable a connection to a particular cord circuit is controlled in the same way as for the line circuit circuit, except that there is no need for line reversal by the calling and called relays. This latter feature is necessary in four-wire circuits as is well known. In addition to the normal marking arrangement for registers, it is a feature of the system that an "indicate cord" marking can be applied to the register which will connect the register hold lead to a more negative potential than the normal hold potential. The reason for this will be seen later.

Indications of the register being free or busy are also transmitted from the register to the register allotter RA, which is part of the common control. This common control also includes the allotter CA for allotting cord circuits. It will be appreciated that each of these allotters is basically a simple counter, and functions in a well known manner.

The function of the link circuit is to provide supervision or monitoring of the four-wire connection, and in addition, and more important, to provide marking facilities between the cord and subscriber or subscriber and register to enable connections within the matrix. The link circuit has two markings and hold leads MHL and RML extending into the matrix. The marking of these leads is carried out separately although the holding is common. It is a feature of the link circuit that for the mark and hold leads RML it can detect the connection of this lead to a more negative potential than the normal negative hold potential in a register. Thus the register can indicate the link circuit to which it is connected by connecting the hold lead in the register to a more negative potential, this shift of potential being detected in the link circuit. The marking instructions to the link take place over the common highways from the common control, and in the case of an initial connection to a calling subscriber the selection of the particular cord is determined by the allotter CA in the common control. A link busy indication is transmitted from the link circuit to the allotter CA, to set the allotter to its position for the next free link.

The common control and marking logic include the two allotters already referred to, and a certain amount of logic for the detection of calling lines and for controlling the marking connections through the switch matrix.

Call Setting.—Assume that a particular line is in the calling condition, that is, that the subscriber has lifted his handset, but has not as yet been connected to a register. When the scan generator SG produces the output which causes a positive output from the calling line's address gate G2 an indication of the calling condition is transmitted via the gate G3 in that line circuit and the highway H1 to the common control arrangements CCM. During the S period of the scan output, the common control detects this line as calling. The common control then, as long as there is at least one free register and one free link, applies an inhibit condition to the gate G1 via the lead L1. Having stopped the scan, the common control or marker circuit then sends a signal on the "up-date" to busy highway H3 and this signal is only effective in the line circuit at whose position the generator SG has stopped. Hence gate G5 in that line circuit delivers an output, and this marks the line circuit in question as busy, so that on the next occasion on which this line circuit is selected, an output is obtained via gate G4 and highway H2. In addition, the up-date to busy removes the calling condition from the calling subscriber highway H1. That is, the energisation on the second input L of gate G3 is removed.

At this time the register allotter RA and the link allotter CA indicate the next free register and link and mark conditions are applied to these in conjunction with a mark condition to the subscriber on the mark highway H4. In addition, a "calling" mark supplied to the subscriber via highway H5 ensures the correct polarity for the four-wire termination. In the present case it is assumed that there are twenty link circuits, and for each link circuit there is a link busy lead CB and a link idle lead CF. If the link is busy, the energisation present on CB for that link causes the allotter to step onto another link when it reaches the busy link's position. When the lead CF for a link is energised, that link's mark gate G6 is open. Consequently when the common control generates a mark link signal, and this signal is offered to all links over the lead MC, the gate G6 in the link marked by the allotter as the next free link is opened. In a similar way, the register allotter marks its output such as RC for the next free register, which opens the corresponding gate G7 in that register.

As a result of the mark applied to the link, positive potentials are applied to both the subscriber and register hold and mark leads RML and MHL, and these with the ground mark potential applied to the line circuit and the register cause the appropriate subscribed cross-point and register cross-point of that cord to operate. These when operated hold to a negative potential over a make contact of the cross-point. The two cross-points are now held operated from the hold gate G8 in the link circuit, which supplies a ground potential. Thus connection has been established between the line circuit and a register via a link circuit and the subscriber can now transmit the wanted number information into the register. This he does when he recives dial tone, which in the present case is assumed to be supplied from the register. Having effected the marking, the common control marker now removes the inhibit from the basic pulse generator by de-energising the lead L1, and scanning can continue. The register and link allotters now step on to indicate their next free positions. Further calling lines that are detected during the scan will be dealt with in a similar manner until all of the link or registers are used up, and one or other of the allotters indicates that no connection can be made for a new calling line. When this condition exists the scan is not stopped and scanning continues until both allotters indicate that a calling line can be dealt with.

When the register has received the called subscriber identity from the calling subscriber, the staticised information is compared continuously with the information being presented from the generator SG on the highways OH. When a positive comparison is detected, and the appropriate register time slot within the scan period for that line occurs, a signal is transmitted from the register over the common highway H6 to the common control marker CCM. This causes the common control to inhibit the output of the pulse generator, as usual via gate G1, so that the scan is stopped at its position for the called subscriber. The common control circuit CCM then transmits a signal over the common highway H7 to the registers, and this signal can only be received in the register that caused the scanning to be stopped. This signal on reception connects the hold register lead HR to a more negative potential than the normal negative hold potential. This shift in potential on the hold lead is therefore transmitted through the cross-point back to the cord circuit which was used to establish the connection between the calling line and that register.

In the link circuit which detects the signal from the register, which detection is effected via an amplification device DET, a gate G9, known as the re-mark gate, is enabled and the common control transmits a re-mark signal on the re-mark highway H8, this signal being offered to all of the cord circuits but being effective only in that in which the gate G9 has been opened as just described. In the link circuit in question the opening of gate G9 results in the subscriber group hold and mark lead being marked once again to the positive potential and the mark subscriber output is addressed to the identity of the called line circuit. This latter is done by a further common highway H9, and as a result of these markings, a connection is established through the cross-point between the original cord circuit and the called subscriber, the signal on the "called" highway H9 being used to correctly orient the four-wire line circuit. Ringing is supplied to the called subscriber from the four-wire line circuit. The original connection of the calling subscriber to this cord remains.

After the above operation, the signal is transmitted from the marker CCM to the register in use for the connection over a common release highway H10. Reception of this signal via gate G11 causes, via a further release gate G12 the disassociation of the register from the call circuit. Consequently the cross-point used in the register part of the connection is released. Finally the inhibit on the scanning operation is removed so that scanning recommences.

If, at the time at which the scan is stopped by the positive comparison from the register, the busy highway on the subscriber line circuit indicates that the wanted subscriber is busy, marking will not be applied to the line circuit highways, that is, no markings will be applied to the highways H9, but an indication of the tone to be returned to the caller is transmitted from marker CCM over highways indicated at H13 to the indicated link circuit. In addition the called circuit does not receive a re-mark condition.

Breakdown of a call occurs when a direct potential is removed from a phantom on the go and return channels of the four-wire circuits is detected at one of the line circuits. This removal is detected in the link circuit in use, and it removes the hold condition from gate G8. This interrupts the series hold on the crosspoints, and the relays in the line circuits, which all release. On release the line circuit changes from "Busy" to "Free," idle and the cord circuit removes its "Busy" condition from lead CB.

It is to be understood that the foregoing description of specific examples of this invention is made by way of example only and is not to be considered as a limitation on its scope.

What I claim is:

1. An automatic telecommunication exchange comprising a switching network having a plurality of subscriber lines, at least one register for controlling the establishment of a connection through said network, a plurality of link circuits connected to outputs of said network, means for connecting a calling one of said lines via said switching network to an idle one of said plurality of link circuits, means for connecting said connecting link circuit to a free register via said switching network, means operated responsive to said register for extending a connection from the calling line to the called line by connecting the originally-seized connected link circuit to the called line via said switching network, and means for releasing the connection from the register via said switching network to said originally seized link circuit.

2. An exchange as claimed in claim 1, and in which said switching network is an array of co-ordinate switching matrices in cascaded interconnection.

3. An exchange as claimed in claim 1, and in which said switching network is a single co-ordinate array.

4. An automatic telecommunication exchange comprising a plurality of subscriber lines, switching network means having inlets and outlets, said subscriber lines being connected to the inlets, a plurality of link circuits connected to the outlets of said network means, a plurality of registers, means responsive to the initiation of a call by one of said subscriber lines to connect that subscriber's line to an idle one of said link circuits and to a free register so that a connection between the calling line, link circuit and register is set up via said network, which connection is maintained under the control of said connected link circuit; means responsive to the reception of a called line identity in the register for applying a marking to the called subscriber's line, means for applying said marking to the called line's inlet to the switching network if that line is then free, further marking means for applying an additional marking to the connected link circuit in use for the call if the called line is free, means responsive to said further marking for causing a connection to be established through the switching network between the called line and the connected link circuit; and means responsive to the establishment of said connections between the called line and said connected link circuit for releasing said path through said network to register, whereby the subscriber-to-subscriber connection is established using the connected link circuit originally seized for the connection from the calling subscriber to the register.

5. An exchange as claimed in claim 4, and in which said switch network is a co-ordinate array of reed relays.

6. An exchange as claimed in claim 4, and scanning means for testing all of said subscriber lines one after the other in search of a calling condition, and means responsive to the detection of a calling condition for stopping said scanning if an idle register and an idle one of said plurality of link circuits is then available, so that the stopped setting of said scanning means identifies the the calling subscriber.

7. An exchange as claimed in claim 6 and means responsive to the stopping of said scanning means for causing the transmission of a signal to the calling line circuit via a highway common to all line circuits, said highway being connected to each line circuit via a gate which is enabled only when said scanning means is in a condition which identifies that line so that said signal is only effective in a calling line circuit, and means responsive to the reception of said scanning signal in the calling line circuit for making that line circuit busy.

8. An exchange as claimed in claim 7 and means responsive to the reception of the signal which busies the calling line circuit for marking its inlet to the switching network, means for marking the inlet to said switching network associated with the next free register and the next idle one of said plurality of link circuit when a calling line is detected, means responsive to said markings for causing the calling line and the idle register both to be connected to said next idle link circuit.

9. An exchange as claimed in claim 8 and means responsive to the calling line vircuit being busied for restarting said scanning of said lines, means responsive to the receipt and storage of the identity of said called line in said register for continuously comparing the outputs of the scanning means with the stored identity information, responsive to said comparing means and operated when the output of said scanning means and said stored identity information are equal for stopping the scan and marking the inlet of the called line as a called line.

10. An exchange as claimed in claim 9 and means responsive to said called line mark when applied to the called line's inlet to the switching network for supplying an additional mark if the called line is idle, and means responsive to said additional mark for causing said called line to be connected to the originally-seized link circuit, whereafter the register and the connection thereto are released.

No references cited.

WILLIAM C. COOPER, Primary Examiner